United States Patent [19]

Nakajima et al.

[11] 4,370,468

[45] Jan. 25, 1983

[54] BIAXIALLY DRAWN POLYHEXAMETHYLENE ADIPAMIDE FILM

[75] Inventors: Osamu Nakajima, Moriyama; Yukinori Matsuoka, Shiga; Yoshiaki Nakayama, Moriyama, all of Japan

[73] Assignee: Asahi Kasei Kogyo Kabushiki Kaisha, Japan

[21] Appl. No.: 204,276

[22] Filed: Nov. 5, 1980

[30] Foreign Application Priority Data

Nov. 13, 1979 [JP] Japan ................................. 54-146033

[51] Int. Cl.$^3$ .............................................. C08G 69/46
[52] U.S. Cl. ................................... 528/335; 264/290.2
[58] Field of Search ........................................... 528/335

[56] References Cited

\* U.S. PATENT DOCUMENTS

| | | | |
|---|---|---|---|
| 3,502,766 | 3/1970 | Tsuruta et al. | 264/289 |
| 3,794,547 | 2/1974 | Kuga et al. | 161/1 |
| 4,252,966 | 2/1981 | Matsuoka et al. | 528/335 |

OTHER PUBLICATIONS

English Translation of Japanese Patent Publication S44-20874 (1969), col. 9, line 3 to col. 10, line 7.
English Translation of Japanese Patent Publication S37-534 (1962), p. 3, right col.
English Translation of Japanese Patent Publication S46-119/1971, col. 4, Scope of claim.
*The Society of Polymer Science, Japan*, "Kobunshi/High Polymers, Japan," 1962, 11 (123) p. 433, lines 1–12.

*Primary Examiner*—Harold D. Anderson
*Attorney, Agent, or Firm*—Finnegan, Henderson, Farabow, Garrett & Dunner

[57] ABSTRACT

Provided is a biaxially drawn film composed substantially of polyhexamethylene adipamide, which has a refractive index of at least 1.560 in both the longitudinal direction and the transverse direction and an ultraviolet absorbance $E_{268}$ of not more than 0.4, as measured at a wavelength of 268 m$\mu$ on a film solution in formic acid. The film preferably exhibits a shrinkage factor of not more than 5% in both the longitudinal direction and the transverse direction, as measured after dipping in hot water at 135° C. for 10 minutes.

The film is prepared by heat-treating a biaxially drawn polyhexamethylene adipamide film in an inert gas atmosphere at a temperature higher than the drawing temperature employed but lower than the melting point of the film.

2 Claims, 2 Drawing Figures

BIAXIALLY DRAWN POLYHEXAMETHYLENE ADIPAMIDE FILM

BACKGROUND OF THE INVENTION (1) Field of the Invention

This invention relates to a biaxially drawn polyhexamethylene adipamide film having improved toughness and appearance and to a process for producing the same. The biaxially drawn polyhexamethylene adipamide film of the invention is characterized as possessing improved toughness, good dimensional stability and a much reduced degree of yellowing.

(2) Description of the Prior Art

In the field of food packaging films, the degree of reliability required has been increasing, and accordingly, films having an enhanced toughness have been desired. Recently, in order to meet the requirements of enhancement of quality and the increase of varieties in retorted food, high-temperature short-time sterilization conditions, that is, highly retorting conditions, have been adopted instead of the conventional retort sterilization conditions, and therefore, in the field of retorted foods, the development of films having an excellent dimension stability sufficient to resist such high-temperature short-time sterilization conditions and an enhanced toughness capable of resisting rough and severe handling in such high-temperature short-time sterilization treatment has eagerly been desired.

In films for retortable pouches of foods, the excellent dimensional stability means that the films exhibit a much reduced change in dimension, i.e., a very low shrinkage factor, when the films are subjected to a retorting treatment with hot water or steam. If the change in dimension is large (i.e., the shrinkage factor is large), the food-packed pouch is deformed, resulting in a drastic reduction of the commercial value. Accordingly, high dimensional stability is indispensable for a film for a food-packaging retortable pouch.

Needless to say, the toughness of a packaging film should be such that the content in a pouch can be reliably protected and breakage or formation of holes, which will inevitably result in reduction of the commercial value, is not caused at all. Even if one pouch is broken among 10,000 pouches, the confidence of consumers to food-packed retortable pouches will be drastically lowered because in the present commercial distribution process for retorted foods and the like, the quality of the packed food or the like is degraded at a normal temperature in a short time if the pouch is broken.

Among various films now manufactured on an industrial scale, biaxially drawn nylon-6 films are used because of their high toughness and polyethylene terephthalate films (hereinafter referred to as "PET films" for brevity) are used because of their high dimentional stability. However, there has not been developed a film which is satisfies simultaneously both of these properties.

We previously succeeded in developing a biaxially drawn polyhexamethylene adipamide film capable of satisfying the foregoing two requirements simultaneously and proposed this film in the specification of U.S. patent application Ser. No. 956,267, now U.S. Pat. No. 4,252,966. Although this proposed polyhexamethylene adipamide film has simultaneously a good dimensional stability and a high toughness, this film fails to have the much enhanced toughness recently required in the art and is not attractive in appearance because it is considerably yellowish. The yellowish hue of a film leads to an undesirable appearance of a food-packed pouch and the commercial value thereof is drastically reduced.

We therefore did researches with a view to improving the biaxially drawn polyhexamethylene adipamide films proposed in U.S. patent application Ser. No. 956,267, now U.S. Pat. No. 4,252,966, and it was found that the above-mentioned three important properties are significantly influenced by the heat treatment step for imparting the dimensional stability in the process for the preparation of drawn films. More specifically, it was found that, when the conventional heat treatment, for example, the relax heat treatment disclosed in Japanese Patent Publication No. 534/62, the high-temperature short-time heat treatment disclosed in Japanese patent application No. 20,874/69 or the heat treatment taught in the above-mentioned U.S. patent application Ser. No. 956,267, now U.S. Pat. No. 4,252,966, is employed in the process of preparing drawn polyhexamethylene adipamide films, the toughness is lowered and the degree of yellowing becomes conspicuous, although there is an increase of the dimensional stability.

The relation between the dimensional stability and the toughness will now be described in detail with reference to FIG. 1. The value of the hot water shrinkage factor, which is an important property for a film for a food-packaging retortable pouch, is plotted as the criterion indicating the dimensional stability on the abscissa in FIG. 1, and the penetration strength is plotted as a typical criterion of the toughness on the ordinate in FIG. 1. In FIG. 1, the relationship between the hot water shrinkage and the penetration strength, observed in a biaxially drawn polyhexamethylene adipamide film heat-treated according to a conventional technique, is illustrated. Each value of the hot water shrinkage factor in FIG. 1 is a mean value of the values as measured, after dipping in hot water at 135° C. for 10 minutes, on both the longitudinal direction and transverse direction of the film.

From FIG. 1, it will readily be understood that if the hot water shrinkage factor is reduced, that is, the dimensional stability is increased, the penetration strength, that is, the toughness, is reduced. The penetration strength is drastically reduced when the hot water shrinkage factor is 5% or lower.

SUMMARY OF THE INVENTION

It is therefore a primary object of the present invention to provide a biaxially drawn polyhexamethylene adipamide film which exhibits an enhanced toughness and dimensional stability, as well as a reduced degree of yellowing.

In one aspect of the present invention, there is provided a biaxially drawn film composed substantially of polyhexamethylene adipamide, which has a refractive index of at least 1.560 in both the longitudinal direction and the transverse direction of an ultraviolet absorbance $E_{268}$ of not more than 0.4, as measured at a wavelength of 268 m$\mu$ on a film solution in formic acid. The biaxially drawn film of the present invention preferably exhibits a shrinkage factor of not more than 5% in both the longitudinal direction and the transverse direction, as measured after dipping in hot water at 135° C. for 10 minutes.

In another aspect of the present invention, there is provided a process for preparing a biaxially drawn polyhexamethylene adipamide film, which comprises the step of heat-treating a biaxially drawn polyhexamethylene adipamide film in an inert gas atmosphere at a temperature higher than the drawing temperature employed, but lower than the melting point of the film.

DESCRIPTION OF THE PREFERRED EMBODIMENTS

The biaxially drawn polyhexamethylene adipamide film of the present invention exhibits a satisfactorily enhanced toughness and reduced yellowing, even though the shrinkage factor in hot water is lower than about 5% in both the longitudinal direction and the transverse direction. By the terms "longitudinal direction" and "transverse direction" used herein are meant the direction of extrusion, that is, the lengthwise direction of the film, and the direction perpendicular to the longitudinal direction, respectively.

The biaxially drawn film of the present invention is substantially composed of polyhexamethylene adipamide. So far as the desired properties of polyhexamethylene adipamide are not harmfully influenced, the polyhexamethylene adipamide may be a copolyamide derived from hexamethylene diamine, adipic acid and a minor amount of one or more other comonomers, or the polyhexamethylene adipamide may have incorporated therein a minor amount of additives, such as a lubricant, a stabilizer, a pigment or a dye.

In the biaxially drawn film, it is indispensable that the refractive index, described hereinafter in detail, should be at least 1.560 in both the longitudinal direction and the transverse direction and the ultraviolet absorbance $E_{268}$ should not be more than 0.4. These requirements will now be described in detail with reference to FIG. 2.

Figure 1:
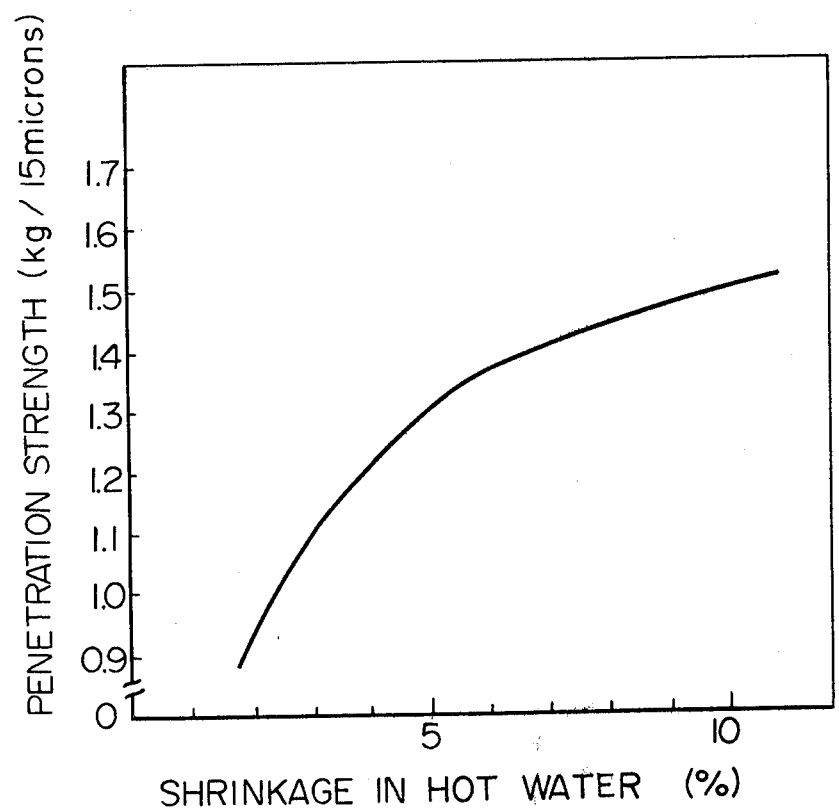
FIG. 1 is a graph illustrating the relationship between the hot water shrinkage factor and the penetration strength in a biaxially drawn polyhexamethylene adipamide film prepared according to a conventional technique.
Figure 2:
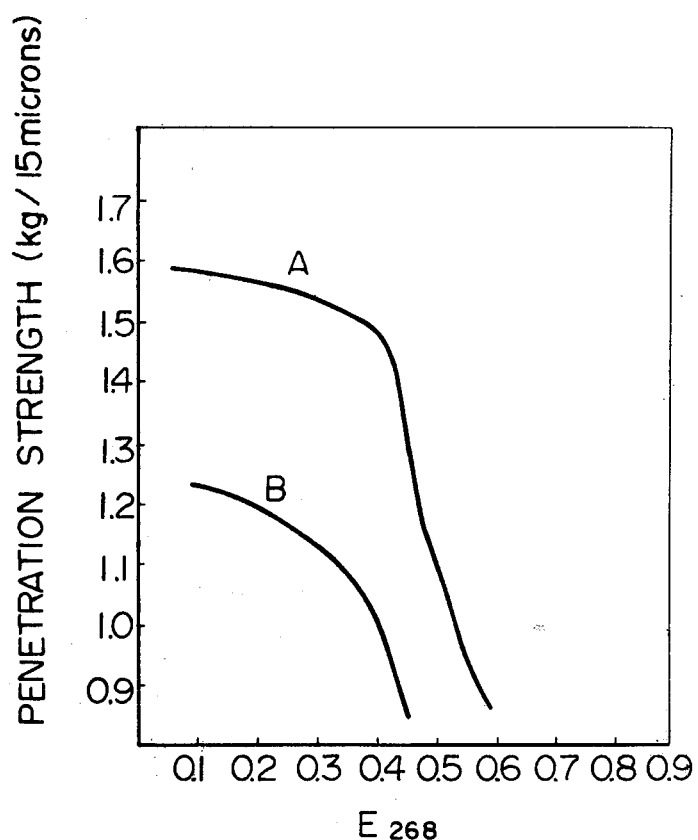
FIG. 2 is a graph illustrating the relationship between the ultraviolet absorbance $E_{268}$ and the penetration strength.

Curve A in FIG. 2 illustrates the relationship between the ultraviolet absorbance $E_{268}$ and the penetration strength in biaxially drawn polyhexamethylene adipamide films prepared under various heat treatment conditions. In each film, the refractive index is at least 1.560 in both the longitudinal direction and the transverse direction. From this curve A, it will readily be understood that when the value $E_{268}$ exceeds 0.4, the penetration strength is drastically reduced. Furthermore, when the value $E_{268}$ is not larger than this critical level, yellowing is caused only to a negligible extent and the film is excellent in the appearance. Generally, it is acknowledged that as the ultraviolet absorbance of a resin (as measured at the absorption wavelength inherent to the resin), which is a criterion indicating the degree of deterioration of the resin, is increased, the mechanical strengths are gradually reduced. Accordingly, it is quite surprising that in a biaxially drawn polyhexamethylene adipamide film, the mechanical strengths are drastically reduced as the ultraviolet absorbance exceeds a certain critical value, as is seen from curve A of FIG. 2. This fact cannot be anticipated at all by a conventional technique. The most characteristic feature of the present invention resides in the finding of this fact. In FIG. 2, curve B demonstrates that when the refractive index is smaller than 1.560 in both the longitudinal direction and the transverse direction, the film exhibits low penetration strengths.

It is preferred that the shrinkage factor of the biaxially drawn film be not more than 5% in both the longitudinal direction and the transverse direction, as measured after dipping in hot water at 135° C. for 10 minutes. This shrinkage factor in hot water is closely related to the density of the film. The higher the density, the lower the shrinkage factor in hot water. It is believed that the reason for this is that since the density indicates relative quantity of the amorphous portion and water intrudes into this amorphous portion by dipping in hot water to enhance crystallization, the lower density will result in an increase of the shrinkage factor. In terms of the density, it is preferred that the density of the film be at least 1.148 g/cm$^3$. The density referred to herein is a value determined at 25° C. by the density gradient tube method using a carbon tetrachloride/toluene solvent.

It is preferable that the biaxially drawn polyhexamethylene adipamide film of the present invention has a relative viscosity of at least 3.2 for the desired penetration strength. The relative viscosity used herein means that which is measured at a temperature of 25° C. on a solution of 1 g of the polymer in 100 ml of aqueous 96% sulfuric acid.

The thickness of the film is oridinarily 5 to 50 microns and preferably 10 to 25 microns.

The penetration strength, which is used as a typical criterion of the toughness in the present invention, will now be described. The method of evaluation of the penetration strength is prescribed according to Japanese Agricultural Standard (JAS)—Retortable Pouch Food. A load-increasing punch having a curvature radius of 0.5 mm at one end thereof and a diameter of 1 mm is vertically struck on a film at a speed of 50 mm/min, and the penetration strength is expressed by the maximum load that can be resisted by the film. At this test, the film sample is tentered on a cylindrical ring so that the film is not slackened and no tensile stress is applied to the film. A large value of the so determined penetration strength is preferred.

The hot water shrinkage factor used in the present invention is the shrinkage percentage as measured after dipping in hot water at 135° C. for 10 minutes. This property is ordinarily adopted as a criterion for evaluating the dimensional stability of a packaging film to be subjected to a high-temperature short-time sterilization treatment, for example, a film for a food-packaging retortable pouch. A smaller value of the hot water shrinkage factor is preferred. When a film is used for a food-packaging retortable pouch, the hot water shrinkage factor should not be more than 5%.

The refractive index referred to in the present invention is one as measured at 20° C. with respect to D-ray sodium by using an Abbe refractometer.

The $E_{268}$ value is determined according to the following method.

First, 1 g of a sample film is completely dissolved in 100 ml of 100% formic acid (guaranteed reagent). Then, the solution is charged in a cell and an absorption spectrum at a wavelength of 268 m$\mu$ is determined, and the ultraviolet absorbance $E_{268}$ is calculated according to the following formula:

$$E_{268} = -\log_{10} T$$

wherein T stands for the percent transmission (268 mµ). Incidentally, the above-mentioned formic acid alone is charged in a reference cell.

The process for the preparation of the film of the present invention will now be described, although the process for the preparation of the film of the present invention is not limited to the embodiments described hereinafter.

First, a resin composed substantially of polyhexamethylene adipamide is molten and extruded through a T-die or circular die, and the extrudate is rapidly cooled by bringing the extrudate into contact with a cooled metal roll or mandrel, whereby a substantially amorphous undrawn film (sheet) is prepared.

For biaxial drawing of films, there may be adopted the sequential biaxial drawing method and the simultaneous biaxially drawing method. However, in the case of a polyhexamethylene adipamide having strong hydrogen bonds, the simultaneous biaxial drawing method is preferably adopted. The drawing temperature is in the range of from 60° 180° C., and the draw ratio is in the range of from 2.5 to 4.0 in both the longitudinal direction and the transverse direction. In order to increase the refractive index, it is preferable that the draw ratio be increased. The refractive index attained at the drawing step is further increased by the subsequent heat treatment.

After the drawing operation, the heat treatment is carried out so as to impart dimensional stability to the film. In order to obtain a film having a value $E_{268}$ not exceeding 0.4 according to the present invention, it is necessary to avoid deterioration during the heat treatment. As a means for attaining this object, there is adopted a special heat treatment method in which the biaxially drawn film is passed through a heating oven in which an inert gas atmosphere is maintained. By adoption of this heat treatment method, the film of the present invention can be obtained conveniently. Furthermore, there may be adopted a method in which the biaxially drawn film is passed through a molten metal.

As the inert gas, there can be used not only nitrogen gas but also other gases that do not deteriorate polyhexamethylene adipamide, such as carbon dioxide or combustion gas. In order to control the value $E_{268}$ at not more than 0.4, it is preferable that the oxygen concentration in the inert gas be not more than 7% by volume, especially not more than 5% by volume. If the oxygen concentration in the inert gas exceeds 7% by volume, deterioration is promoted and it becomes impossible to maintain the value $E_{268}$ at not more than 0.4.

The heat treatment is carried out at a temperature higher than the drawing temperature, but lower than the melting point of the film. In order to obtain a film especially excellent in dimensional stability, it is preferable that the heat treatment be carried out at a temperature not lower than 220° C. but lower than the melting point of the film. The heat treatment time is shorter than 20 seconds, preferably shorter than 10 seconds.

The present invention will now be described in more detail with reference to the following Examples that by no means limit the scope of the invention.

EXAMPLES 1 THROUGH 6 AND COMPARATIVE EXAMPLES 1 THROUGH 8

A substantially amorphous undrawn film having a thickness of 130µ and a density of 1.127 g/cm³ was prepared from a polyhexamethylene adipamide having a relative viscosity of 3.6 as measured at 25° C. in 96% sulfuric acid, by using an extruder type film-forming apparatus. The film was drawn simultaneously in both the longitudinal direction and the transverse direction at a draw ratio of 2.5 to 3.0 in both directions. The drawn film, both side ends of which were fastened by clips, was passed through a heating oven with a nitrogen gas atmosphere in which the oxygen concentration could be changed, and the film was heat-treated under tension at various temperatures. The refractive index, value $E_{268}$, and the hot water shrinkage factor of the obtained films were measured. The results are shown in Table I, below.

TABLE I

| Example No. | Drawing Conditions Drawing Ratio (MD × TD) | Temperature (°C.) | Gas Concentration (% by volume) O₂ | N₂ | Heat Treatment Conditions Temperature (°C.) | Time (seconds) | Refractive Index (M/TD) | $E_{268}$ | Penetration Strength (Kg/15µ) | Hot Water Shrinkage Factor (%) (135° C. × 10 min) MD | TD | Appearance of Film (degree of yellowing) | Density (g/cm³) |
|---|---|---|---|---|---|---|---|---|---|---|---|---|---|
| Ex. 1 | 3.0 × 3.0 | 120 | 0 | 100 | 250 | 3 | 1.567/1.568 | 0.11 | 1.56 | 2.5 | 2.6 | Slight | 1.159 |
| Ex. 2 | 3.0 × 3.0 | 120 | 0 | 100 | 240 | 3 | 1.562/1.562 | 0.11 | 1.58 | 4.5 | 4.5 | " | 1.153 |
| Ex. 3 | 3.0 × 3.0 | 120 | 3 | 97 | 250 | 3 | 1.568/1.569 | 0.30 | 1.54 | 2.4 | 2.6 | " | 1.160 |
| Ex. 4 | 3.0 × 3.0 | 120 | 3 | 97 | 240 | 3 | 1.564/1.564 | 0.27 | 1.56 | 4.3 | 4.5 | " | 1.153 |
| Ex. 5 | 3.0 × 3.0 | 120 | 5 | 95 | 250 | 3 | 1.569/1.570 | 0.40 | 1.49 | 2.0 | 2.5 | Small | 1.161 |
| Ex. 6 | 3.0 × 3.0 | 120 | 5 | 95 | 240 | 3 | 1.565/1.566 | 0.30 | 1.53 | 4.0 | 4.1 | Slight | 1.154 |
| Comp. Ex. 1 | 2.5 × 2.5 | 120 | 0 | 100 | 250 | 3 | 1.558/1.557 | 0.11 | 1.20 | 1.5 | 1.5 | " | 1.154 |
| Comp. Ex. 2 | 2.5 × 2.5 | 120 | 0 | 100 | 240 | 3 | 1.557/1.557 | 0.11 | 1.25 | 2.0 | 2.1 | " | 1.153 |
| Comp. Ex. 3 | 2.5 × 2.5 | 120 | 5 | 95 | 250 | 3 | 1.558/1.558 | 0.40 | 1.05 | 1.0 | 1.1 | " | 1.155 |
| Comp. Ex. 4 | 2.5 × 2.5 | 120 | 5 | 95 | 240 | 3 | 1.557/1.558 | 0.34 | 1.10 | 1.3 | 1.4 | " | 1.154 |
| Comp. Ex. 5 | 3.0 × 3.0 | 120 | 10 | 90 | 250 | 3 | 1.570/1.571 | 0.50 | 1.11 | 2.0 | 2.3 | Large | 1.162 |
| Comp. Ex. 6 | 3.0 × 3.0 | 120 | 10 | 90 | 240 | 3 | 1.567/1.567 | 0.45 | 1.25 | 3.7 | 4.3 | " | 1.154 |
| Comp. Ex. 7 | 3.0 × 3.0 | 120 | 21 | 79 | 250 | 3 | 1.571/1.571 | 0.54 | 0.92 | 1.8 | 2.1 | " | 1.162 |
| Comp. | 3.0 × 3.0 | 120 | 21 | 79 | 204 | 3 | 1.568/1.568 | 0.48 | 1.12 | 3.8 | 3.8 | " | 1.155 |

TABLE I-continued

| Example No. | Drawing Conditions Drawing Ratio (MD × TD) | Drawing Conditions Temperature (°C.) | Gas Concentration (% by volume) O₂ | Gas Concentration (% by volume) N₂ | Heat Treatment Conditions Temperature (°C.) | Heat Treatment Conditions Time (seconds) | Refractive Index (M/TD) | $E_{268}$ | Penetration Strength (Kg/15μ) | Hot Water Shrinkage Factor (%) (135° C. × 10 min) MD | Hot Water Shrinkage Factor (%) (135° C. × 10 min) TD | Appearance of Film (degree of yellowing) | Density (g/cm³) |
|---|---|---|---|---|---|---|---|---|---|---|---|---|---|
| Ex. 8 | | | | | | | | | | | | | |

Note
MD: longitudinal direction of film
TD: transverse direction of film

From the results shown in Table I, it will readily be understood that when the refractive index of the film is at least 1.560 in both the longitudinal direction and the transverse direction and the value $E_{268}$ is not more than 0.4, the toughness is excellent, even if the hot water shrinkage factor is small, and the degree of yellowing is much reduced.

COMPARATIVE EXAMPLES 9 THROUGH 11

A biaxially drawn film obtained in the same manner as described in Example 1 was heat-treated according to the method disclosed in Japanese Patent Publication No. 534/62, Japanese Patent Publication No. 20,874/69 or U.S. patent application Ser. No. 956,267, now U.S. Pat. No. 4,252,966. The properties of the obtained films are shown in Table II, below. The heat treatment conditions adopted were as described below.

In Comparative Example 9, the drawn film was subsequently passed through a hot air oven with an air atmosphere and heat-treated at 235° C. for 3 seconds under tension. Then, the film was allowed to shrink by 5% in the transverse direction at the same temperature over a period of 3 seconds, and then, the film was heat-treated at the same temperature under tension for 3 seconds.

In Comparative Example 10, the drawn film was subsequently passed through a hot air oven with an air atmosphere and heat-treated at 250° C. for 2 seconds under tension.

In Comparative Example 11, the drawn film was subsequently introduced into heating rolls. First, the film was preliminarily heated by two rolls maintained at 100° to 150° C. and then, the film was heat-treated by bringing the film into contact with six rolls maintained at 230° C. for 6 seconds, under tension in the longitudinal direction but under a 2% shrinkage condition in the transverse direction.

From the results shown in Table II, it will readily be understood that in the films prepared according to the conventional methods, the hot water shrinkage factor is maintained at a low level, whereas the toughness is reduced and the degree of yellowing is increased.

It is to be noted that, although there is a difference between the values of the penetration strength disclosed in the specification of U.S. patent application Ser. No. 956,267, now U.S. Pat. No. 4,252,966, and the values of the penetration strength shown in Table II, above, this difference is due to the fact that the measurement method adopted in U.S. patent application Ser. No. 956,267, now U.S. Pat. No. 4,252,966, is different from the above-mentioned measurement method adopted in the present Examples. More specifically, in the method of U.S. patent application Ser. No. 956,267, now U.S. Pat. No. 4,252,966, the sample is attached to the measuring device (cylindrical ring) under tension and the measurement is carried out in the state whereby tension is applied to the film. On the other hand, in the present Example, as described hereinabove, the measurement is carried out in the state where no substantial tension is applied to the sample film.

EXAMPLE 7

An undrawn film obtained in the same manner as described in Example 1 was drawn simultaneously in both the longitudinal and transverse directions at 140° C. at a draw ratio of 3.0 in both directions to obtain a biaxially drawn film.

The drawn film was subsequently heat-treated in a nitrogen gas atmosphere having an oxygen concentration of 3.0% by volume at 245° C. for 3 seconds, and the heat-treated film was then cooled to obtain a film having a thickness of 15.5μ. The relax ratio in the transverse direction at this cooling treatment was 5%. Properties of the obtained film were as shown below.

Refractive index: 1.567 in both MD and TD
$E_{268}$: 0.28

TABLE II

| Comparative Example No. | Refractive Index (MD/TD) | $E_{268}$ | Penetration Strength (Kg/15μ) | Hot Water Shrinkage Factor (%) (135° C. × 10 min) MD | Hot Water Shrinkage Factor (%) (135° C. × 10 min) TD | Appearance of Film (degree of yellowing) | Density (g/cm³) |
|---|---|---|---|---|---|---|---|
| 9 (Japanese Patent Publication No. 534/62) | 1.567/1.567 | 0.45 | 1.28 | 4.6 | 4.2 | Large | 1.153 |
| 10 (Japanese Patent Publication No. 20.874/69) | 1.567/1.567 | 0.47 | 1.21 | 3.8 | 3.8 | " | 1.155 |
| 11 (U.S. Patent Application Ser. No. 956,267) | 1.568/1.568 | 0.5 | 1.10 | 3.3 | 3.2 | " | 1.156 |

Initial modulus of elasticity under tension:
MD: 285 kg/mm²

TD: 280 kg/mm$^2$
Strength at break under tension:
MD: 24.0 kg/mm$^2$
TD: 23.5 kg/mm$^2$
Elongation at break under tension:
MD: 85%
TD: 90%
Hot water shrinkage factor (135° C.×10 minutes):
MD: 3.0%
TD: 2.8%
Penetration strength: 1.53 kg/15μ
Haze: 2%
Degree of yellowing: slight
Density: 1.158 g/cm$^3$

We claim:
1. A biaxially drawn film composed substantially of polyhexamethylene adipamide, said film having a refractive index of at least 1.560 in both the longitudinal direction and the transverse direction and an ultraviolet absorbance $E_{268}$ of not more than 0.4, as measured at a wavelength of 268 mμ on a film solution in formic acid, and wherein said film exhibits a shrinkage factor of not more than 5% in both the longitudinal direction and the transverse direction, as measured after dipping in hot water at 135° C. for 10 minutes.
2. The biaxially drawn film according to claim 1, wherein said film has a density of at least 1.148.

* * * * *